United States Patent [19]
Granholm

[11] 4,058,986
[45] Nov. 22, 1977

[54] GROUND STABILIZING AGENT FEEDING DEVICE

[75] Inventor: Sven Granholm, Skelleftea, Sweden

[73] Assignee: Linden-Alimak AB, Skelleftea, Sweden

[21] Appl. No.: 579,430

[22] Filed: May 21, 1975

[51] Int. Cl.² .............................................. E02D 3/12
[52] U.S. Cl. .......................................... 61/63; 222/194; 222/368; 61/35
[58] Field of Search ............... 61/35, 36, 63; 222/194, 222/368; 302/49

[56] References Cited

U.S. PATENT DOCUMENTS

| 3,130,879 | 4/1964 | Messing | 222/368 |
| 3,223,288 | 12/1965 | Stern | 222/194 |
| 3,291,536 | 12/1966 | Smoot | 302/49 |
| 3,300,988 | 1/1967 | Phares et al. | 61/63 |
| 3,556,355 | 1/1971 | Ruiz | 222/368 |

FOREIGN PATENT DOCUMENTS

| 1,234,604 | 6/1971 | United Kingdom | 61/35 |

Primary Examiner—Casmir A. Nunberg
Assistant Examiner—David H. Corbin

[57] ABSTRACT

Equipment for injecting and mixing a pulverulent ground stabilizing agent into the material of the ground including an improved feeding means having a cylindrical chamber with rotatable vanes separating the chamber into compartments for receiving the pulverulent material and including pressure fluid passages for communicating with each compartment as pulverulent material is to be discharged therefrom for carrying the material out of that compartment.

13 Claims, 3 Drawing Figures

GROUND STABILIZING AGENT FEEDING DEVICE

The present invention generally relates to a ground stabilizing equipment comprising a ground drilling assembly for injecting and mixing a pulverulent ground stabilizing agent into ground material, a storage container for storing said ground stabilizing agent, conduit means for said agent extending from said container to said ground drilling assembly, and feeding means associated with said container for feeding and portioning said agent into said conduit means.

In the British Pat. No. 1,234,604 there is described a method for stabilizing in the first place cohesion earths by binders, in particular cement and lime products, wherein a tool formed as a drill head including an injection nozzle for the binder is driven down into the earth to a desired depth, whereupon the tool is withdrawn while simultaneously supplying binding agent under pressure through the nozzle apertures and stirring the earth material adjacent thereto, so that the binding agent is mixed with the earth material. More specifically, the tool is comprised of an earth drill of a rotary type with a drill head located at the end of the drill rod, said nozzle apertures communicating with a supply conduit for pressurized binder extending down through the drill rod.

In the above mentioned British patent there is also disclosed the use of a binder, which is supplied in the form of a dry powder in connection with the earth stabilizing equipment described above. As a binder, or stabilizing agent in the first place quick lime in the form of a powder is used, which releases heat upon reaction with the ground water, whereby the stabilizing process is accelerated. According to an embodiment described in said patent the pulverulent binding agent is blown by means of pressurized air from a hopper or a storage vessel for the agent through a conduit to the drill rod.

Lime in the form of powder is a substance difficult to handle due to its tendency of lumping together and entering into and sticking onto all objects and surfaces with which it comes into contact.

It is furthermore very important to the ground stabilizing process that the admixed lime quantity can be maintained constant within certain limits. One object of the invention is to solve the problems occurring in connection with transportation of lime powder in a ground stabilizing equipment of the kind mentioned above.

According to the invention the feeding means comprises an essentially cylinder-shaped chamber, said chamber having two end walls, a shaft rotatably journalled in said end walls coaxially within said chamber said shaft carrying a number of disc-shaped wall members extending between said end walls, said wall members each having a side edge remote from said shaft and two end edges, said side edge being slidably associated with the internal cylindric wall of said chamber and said end edges being slidably associated with said end walls, said wall members thereby dividing said chamber into compartments rotatable with said shaft, said chamber further comprising a stabilizing agent inlet communicating with the interior of said container, a stabilizing agent outlet communicating with said conduit means, and at least one pressure fluid inlet, each of said compartments during a first part of one revolution of said shaft communicating with said stabilizing agent inlet but lacking connection with said outlet, and during a second part of the same revolution communicating with said outlet and said pressure fluid inlet, but lacking connection with said stabilizing agent inlet.

It is also important that it is possible to check that the correct lime quantity is actually supplied and mixed into the ground. Previously this has been attained by determining the level of the stabilizing agent in the storage vessel by means of an instrument. However, at large dimensions of the storage vessels the output amount of stabilizing agent per time unit cannot be controlled in this manner with sufficient accuracy. In order to eliminate this disadvantage one embodiment of the device according to the invention is provided with control means associated with said chamber for controlling the quantity of stabilizing agent supplied through said feeding means.

The invention will now be described more closely below with reference to the attached drawings, on which FIG. 1 in side view illustrates a ground stabilizing equipment;

Figure 1:
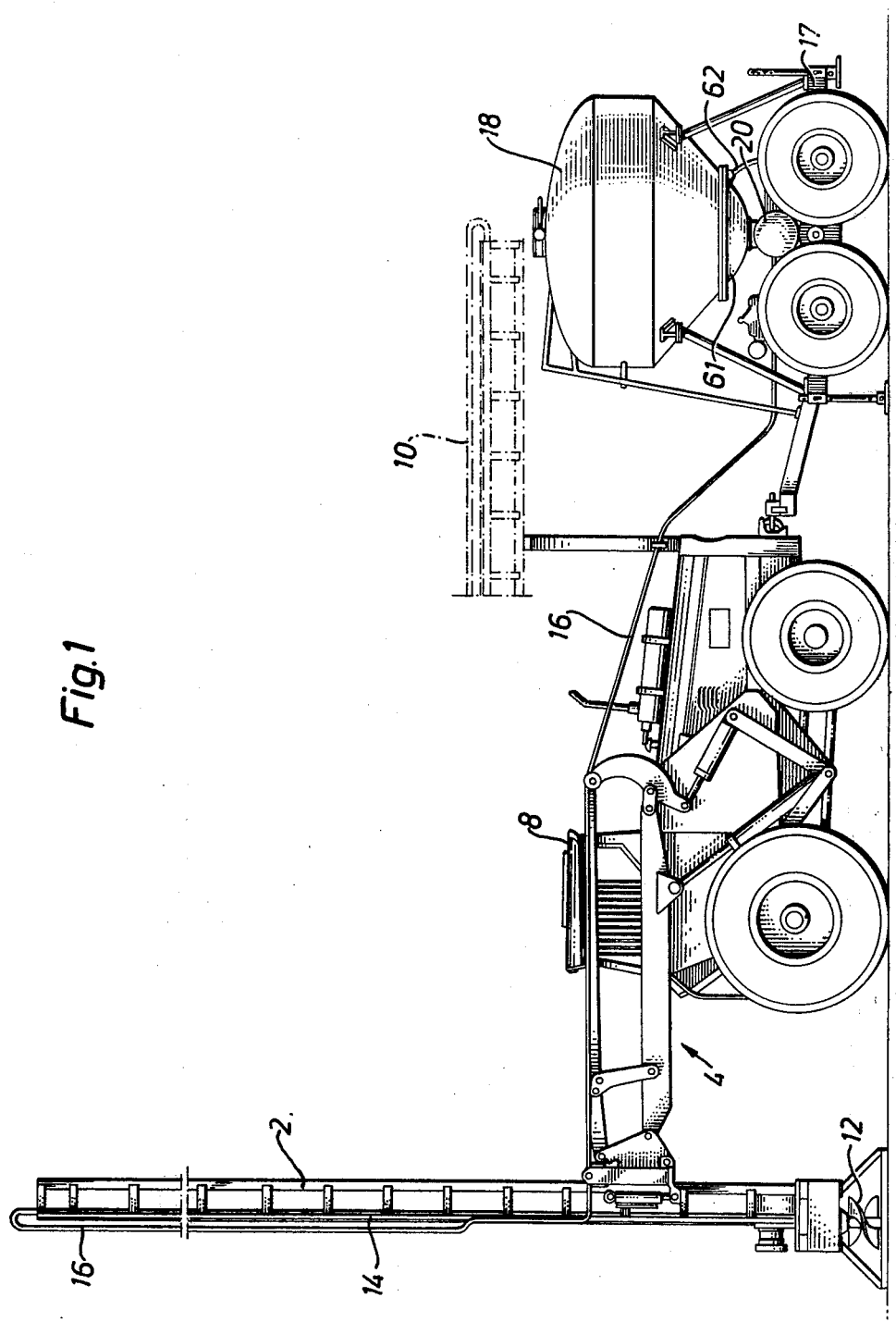

The ground stabilizing equipment illustrated in FIG. 1 comprises a lattice mast 2, which is supported at 4 by means of a hydraulic motor operated link arm system, generally referenced 6, which is mounted on a transport vehicle 8. By means of the link arm system 6 the lattice mast 2 can be pivoted from the operative position in FIG. 1 rearwardly over the vehicle so as to take the position shown by broken lines at 10.

The lattice mast 2 forms a guide for a ground drill of the kind described in the above-mentioned patent, said ground drill at the bottom end thereof being provided with a tool comprising a drill head 12. The drill rod referenced 14, which carries the drill head 12 at the bottom end thereof, contains an axial duct for supplying a pulverulent binding agent, e.g., lime, to the drill head 12, where outlet apertures for the binding agent are located. To the axial duct in the drill rod 14 a conduit 16 extends from a storage container 18 for the binding agent, said container being carried by a trailer 17. In the bottom of the container 18 there is provided a feeding device 20 for feeding the binding agent into the conduit 16.

The method of operation when performing a ground stabilizing operation is described in the patent mentioned above and therefor need not be described more closely here.

Figure 2:
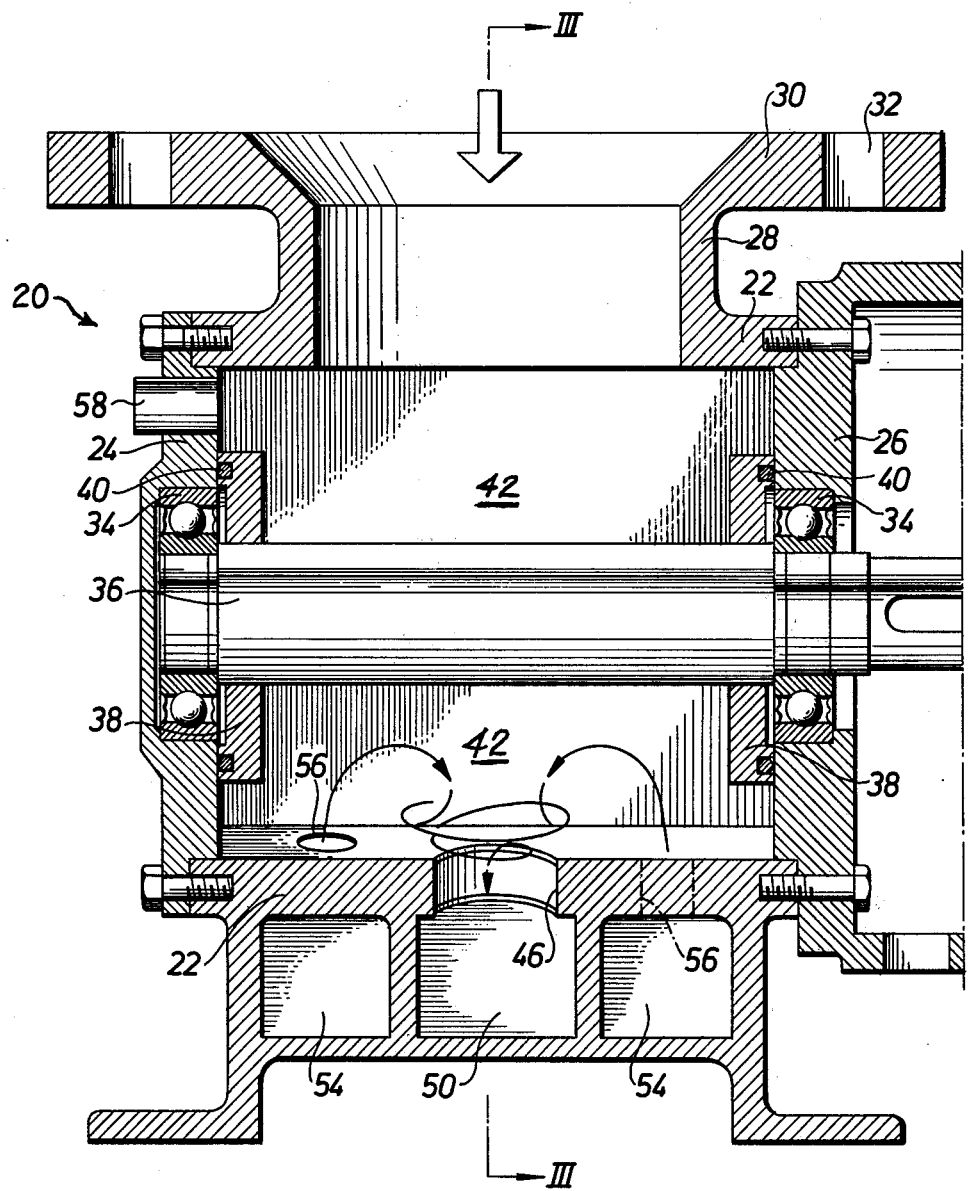
FIG. 2 is an axial section through a feeding device for pulverulent ground stabilizing agent.
Figure 3:
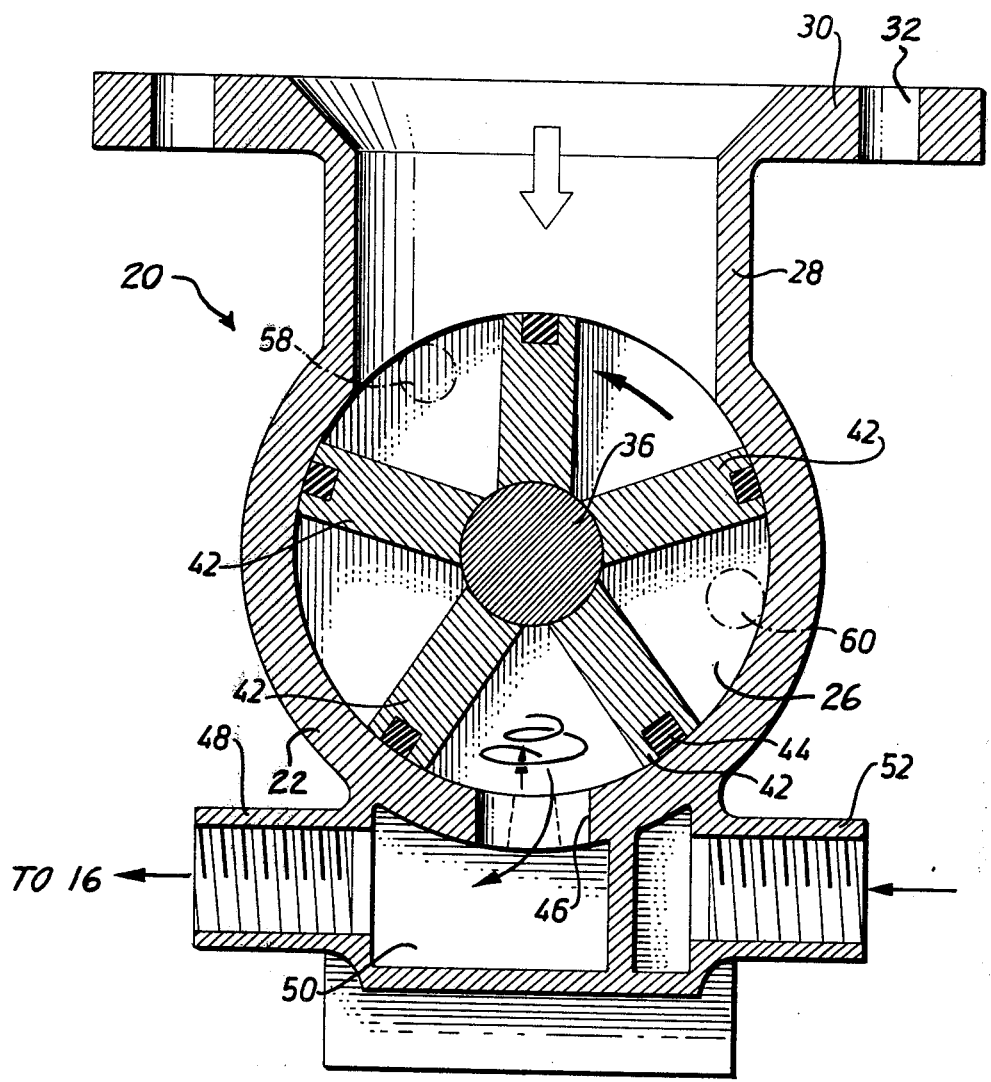
FIG. 3 is a cross section in the direction of arrows III—III in FIG. 2.

Referring in particular to FIGS. 2 and 3, the output device 20 comprises a cylinder-shaped chamber with a mantle wall referenced 22 and end walls 24 and 26, respectively. To the top side of the cylinder-shaped chamber there is connected an inlet pipe stud 28 with a large internal cross section, which at the end thereof presents an annular flange 30 with bolt holes 32. By means of the flange 30 the chamber is connected to the bottom of the container 18 in the manner illustrated in FIG. 1.

The end walls 24 and 26 contain bearings 34 for a shaft 36 rotatably mounted in the cylinder-shaped chamber. The shaft 36 non-rotatably carries protective walls 38 for the bearings 34 at the end walls 24 and 26, respectively. The protective walls 38 have a smaller radial extension than the internal cross section of the chamber and are sealingly and rotatably abutting the corresponding end walls 24 and 26, respectively, of the chamber, by means of an O-ring 40.

In addition, the shaft 36 carries five axially extending and equally distributed, disc-shaped wall members 42, the opposite radially extending end edges of which are connected with the protective walls 38 and sealingly and slidably abutting the end walls 24 and 26, respectively, and the axially extending side edges of which remote from the shaft 36, are sealingly and slidably abutting the internal cylindric mantle surface of the chamber. Of the described arrangement FIG. 3 only shows rod-shaped slide seals 44, which are located in longitudinally extending recesses in the wall members 42. By means of the wall members 42 the chamber is divided into compartments rotating with the shaft 36.

The inlet aperture 28 of the chamber preferably spans a region of the mantle surface of the chamber, which substantially exceeds the peripheral distance between two wall members 42, located adjacent each other and being of the same order of magnitude as the length of the chamber.

Diametrically opposite the inlet 28 an outlet aperture 46 is provided in the cylindrical mantle surface of the chamber, said outlet having a connection to the conduit 16 via a connecting stud 48. Between the connecting stud 48 and the outlet 46 an outlet chamber 50 is located. The feeding device also comprises a pressurized fluid inlet, comprising a connecting stud 52, which is terminated by two branch chambers 54, one on each side of the chamber 50. From each branch chamber 54 a supply hole 56 opens into the cylinder-shaped chamber. The supply holes 56 are located on each side of a plane containing the shaft 36 and passing through the centre of the outlet 46, and at a distance from said plane, twice the value of which is less than the peripheral distance between two wall members 42 located adjacent each other.

In the end wall 24 of the cylinder-shaped chamber two capacitive sensors, indicated schematically at 58 and 60, respectively, are mounted, for measuring and-/or controlling the contents of the rotating compartments.

In the bottom of the container 18, above the inlet 28 to the cylinder-shaped chamber, a fluidizer 61 is provided, to which a pressurized air line 62 leads. By means of said fluidizer, which can be of a construction well known to a person skilled in the art, an intense stirring of the binding agent powder in the bottom of the container and a vibratory action is caused, eliminating the risk of the binding agent powder lumping in the bottom of the container and sticking to the bottom walls thereof and in the inlet 28.

In operation of the feeding device described above, the shaft 36 is rotated and pressurized air is supplied via 52 and via 62, respectively. Preferably, equal air pressure is maintained on boths sides of the feeding device so as to expose the rotor member and the walls 42 thereof to a minimum load. The supply of pressurized air at 52 and 62, respectively, is preferably performed from the same pressurized air compressor 63 on the trailer vehicle. The powder is fed downwards into the rotating compartments formed between the walls 42 and when a filled compartment is located above the apertures 46 and 56, the powder enclosed therein is exhausted by means of the pressurized air supplied through the apertures 56 and is conducted further through the conduit 16. The exhaust and stirring of the powder caused in the momentarily lower compartment by means of the pressurized air is very intense due to the location of the inlets 56, and the compartment is blown completely clean.

As shown by FIG. 3 the capacitive sensor 58 is positioned so that measurement and control of a normally filled compartment is performed, while the second sensor 60 is positioned so that measurement of a normally empty compartment is performed. By means of the capacitive sensors 58 and 60 the quantity of binder in the compartments may be measured and by means of comparison means, which are not shown or described more closely here, but which may be of a kind easy to realize by a person skilled in the art, the sensing results at both measuring points are compared. Preferably, the operation of the sensing means, i.e., the capacitive sensors, is control led by the rotation of the shaft 36 so as to perform the sensing only during a time interval, which is substantially shorter than the time required for a compartment to pass the measuring point, whereby interference from the rotor walls 42 is avoided. The measuring equipment can be so designed that pulses of an amplitude corresponding to the quantity of binder in the compartments are supplied, the comparison means being adapted to compare the pulse amplitudes.

The sensing means may also preferably be connected to a device for monitoring the rotary speed of the shaft by monitoring the frequency of the pulses.

The measuring equipment described above thus allows, by recording or counting the measuring pulses by means of convenient instruments, that a direct measure of the output amount of stabilizing agent can be obtained, so that said amount may be controlled.

More specifically, the capacitive sensors may be, e.g., of the kind having an oscillator, the feedback network of which comprises a positive and a negative path. The two branches are so designed that the negative feedback is dominating and prevents the system from oscillating. Should an object approach the sensing surface of the sensor, the negative feedback is reduced and the positive feedback will cause the system to oscillate.

I claim:

1. A ground stabilizing equipment comprising
 a ground drilling assembly for injecting and mixing a pulverulent ground stabilizing agent into ground material,
 a storage container for storing said ground stabilizing agent,
 conduit means for said agent extending from said container to said ground drilling assembly,
 feeding means associated with said container for feeding and portioning said agent into said conduit means,
 said feeding means comprising a housing defining an essentially cylinder-shaped chamber,
 said housing having two end walls,
 a shaft rotatably journalled in said end walls coaxially within said chamber,
 said shaft carrying a plurality of radially and axially extending vane members extending between said end walls,
 said vane members each having a radial peripheral edge remote from said shaft and two axial end edges,
 said radial edge being slidably associated with the internal cylindrical wall of said chamber and said end edges being slidably associated with said end walls, said vane members being substantially equally spaced around said shaft and thereby dividing said chamber into a plurality of substantially equal compartments rotatable with said shaft, said chamber housing further defining a stabilizing agent inlet communicating with the interior of said storage container and a stabilizing agent outlet communicating with said conduit means and at least two pressure fluid inlets, each of said compartments during a first part of one revolution of said shaft communicating exclusively with said stabilizing agent inlet, and each of said compartments during a second part of the same revolution communicating exclusively with said outlet and said pressure fluid inlets, said stabilizing agent inlet spanning a sector of the cylindrical surface of said chamber substantially exceeding the peripheral distance between two adjacent vane members and being of the same order of magnitude as the axial length of said chamber, said outlet being located diametrically opposite said stabilizing agent inlet and being smaller than said peripheral distance between two adjacent vane members, said two pressure fluid inlets being completely separate from said outlet and including at least one pressure fluid inlet located on each side of said outlet as seen when viewed in the axial direction of the chamber to provide a stirring and exhaust of the contents of the compartment in communication with said outlet by fluid passing from said pressure fluid inlets and through said compartment to said outlet.

2. An equipment as claimed in claim 1 wherein
each compartment during a third part of the same revolution between said first and second parts is sealed off to prevent connection with any of said inlets or outlet.

3. An equipment as claimed in claim 1 comprising
control means associated with said chamber for controlling the quantity of stabilizing agent supplied through said feeding means.

4. An equipment as claimed in claim 3 wherein
said control means comprises sensing means provided in the walls of said chamber housing for sensing the volume of stabilizing agent contained in the respective compartments as said compartments are rotated through at least two different predetermined positions,
and comparison means for comparing sensing results obtained from said different positions.

5. An equipment as claimed in claim 4 wherein
said sensing means comprise capacitive means.

6. An equipment as claimed in claim 4 wherein
said sensing means are controllable by the rotation of said shaft so as to perform said sensing only during a time interval which is substantially shorter than the time required for a compartment to pass a sensing point at which a sensing means is located.

7. An equipment as claimed in claim 4 wherein
said sensing means are connected to supply sensing signals to a device for controlling and monitoring the rotary speed of the shaft.

8. An equipment as claimed in claim 4 wherein
said sensing means are operable to supply measuring pulses of an amplitude corresponding to the volume of stabilizing agent contained in the respective compartments,
said comparison means being operable to compare the pulse amplitudes from the respective sensing means.

9. An equipment as claimed in claim 8 wherein
said comparison means is also operable to measure the pulse frequency.

10. An equipment as claimed in claim 1 wherein five of said vane members are equally spaced around said shaft.

11. An equipment as claimed in claim 1 wherein
said pressure fluid inlets are located on each side of a plane containing said shaft and passing through the center of said outlet and at a distance from said plane which is less than one-half said peripheral distance between two adjacent vane members.

12. An equipment as claimed in claim 1 comprising
means for maintaining substantially equal working pressures in said storage chamber and in the pressure fluid supplied through said fluid inlet.

13. An equipment as claimed in claim 1 wherein
a fluidizing device is provided in the bottom of the storage container ahead of said feeding means.

* * * * *

UNITED STATES PATENT AND TRADEMARK OFFICE
CERTIFICATE OF CORRECTION

PATENT NO. : 4,058,986
DATED : November 22, 1977
INVENTOR(S) : SVEN GRANHOLM

It is certified that error appears in the above-identified patent and that said Letters Patent are hereby corrected as shown below:

Title should read --Ground Stabilizing Equipment--

Title page, left hand column, after line 9 and before
       line 10 insert
       --[30] Foreign Application Priority Data
         June 4, 1974    Sweden    74.07318-0--

Column 2, lines 28 and 29, ", generally referenced 6,"
               should be cancelled line 30, after "system" cancel "6".

Signed and Sealed this

Fourteenth Day of March 1978

[SEAL]

Attest:

RUTH C. MASON
Attesting Officer

LUTRELLE F. PARKER
Acting Commissioner of Patents and Trademarks